UNITED STATES PATENT OFFICE.

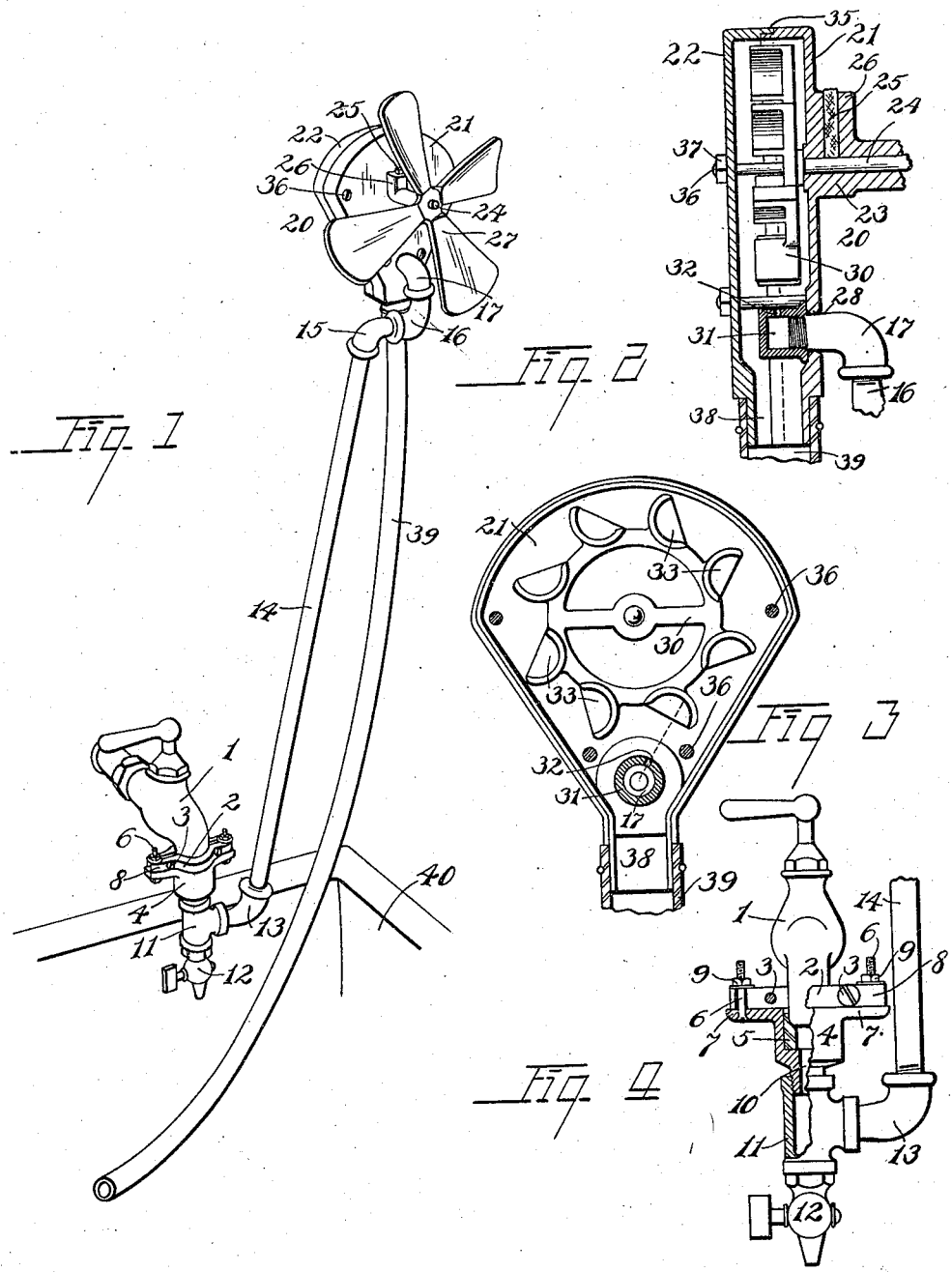

FRANK L. HURTT AND ALBERT S. WRIGHT, OF CLEVELAND, OHIO.

WATER-MOTOR FAN.

1,301,056.  Specification of Letters Patent.  Patented Apr. 15, 1919.

Application filed December 4, 1914. Serial No. 875,529.

*To all whom it may concern:*

Be it known that we, (1) FRANK L. HURTT, (2) ALBERT S. WRIGHT, citizens of the United States, residing at Cleveland, in the county of Cuyahoga and State of Ohio, have invented a certain new and useful Improvement in Water-Motor Fans, of which the following is a full, clear, and exact description, reference being had to the accompanying drawings.

This invention relates to a water motor fan, and it has for its objects the provision of a cheap and efficient fan of the aforesaid character which is adapted to be connected to and supported from an ordinary water faucet, in various positions with respect thereto; to provide means for very securely attaching the inlet connection of the fan motor to a faucet having a smooth spout; to incorporate within the connections between the faucet and the motor, a valve whereby water may be drawn from the line without interfering with the aforesaid connections or without affecting, to any appreciable extent, the operation of the motor; and, more limitedly, to provide a water motor fan of the foregoing nature which is composed, to a considerable extent, of standard fittings, such as may be secured from practically any plumbing supply house, and certain other simple especially made parts, and assembled in such a manner as to avoid the necessity of machining any of the parts in order to produce water tight joints, and to reduce the aforesaid special parts to as simple a design as possible, making the entirety a very inexpensive structure.

In the accompanying drawings, Figure 1 is a perspective view of our water motor fan attached to an ordinary faucet and arranged to discharge its waste water into a sink supported below said faucet; Fig. 2 is a central, vertical section through the motor casing, on a line substantially coincident with the center of the fan shaft; Fig. 3 represents an elevation from the rear of the fan casing, the rear half of the casing being removed and certain of the parts shown in section, and Fig. 4 is a detail of the connection between the faucet and the supply pipe of the motor.

Taking up a detailed description of the invention by the use of reference characters, 1 represents a water faucet to the smooth spout of which is securely clamped the opposed halves of a split collar 2, by means of screws 3. A cup or socket member 4, containing a thimble or gasket 5 of suitable packing material, such as rubber, is supported from the split collar 2, by bolts 6 which pass upward through lateral extensions 7 of the cup and occupy recesses that are formed between the opposed faces of the ears 8, which extend from the collar 2, the upper ends of the bolts 6 having nuts 9 applied to them whereby the cup or socket member may be firmly drawn up over the end of the faucet to secure, by reason of the packing material 5, a water tight joint between the cup and the faucet.

Threaded upon the tubular extension 10 which depends from the cup 4, is an ordinary T fitting 11, to the bottom or opposite end of which is applied a pet cock or valve 12. The reduced, threaded end of an elbow 13 is screwed into the lateral branch of the T 11, and the opposite end of the elbow receives the lower, threaded end of a pipe 14. The upper end of this pipe has threaded upon it an elbow 15, the opposite end of which is received by a similar elbow 16 which, in turn, has its externally threaded end screwed into the end of an elbow 17 that has connection with the motor casing, shown generally at 20. The parts between the cup 4 and the motor casing are of standard type and size, and can be procured easily and cheaply from the market.

By reason of the construction so far described, there is a substantially universal movement afforded the fan casing with respect to the faucet, the threaded connections between the various elbows, the T 11, and the pipe 14, permitting considerable play without becoming loose enough to cause leakage between the various parts.

The motor casing comprises the front and rear halves 21 and 22, respectively, and the former has a cylindrical boss 23 extending from its front face, which forms a bearing for the fan shaft 24. This bearing is lubricated through a wick 25, which may be saturated with a lubricant, and which occupies a vertical bore within a boss 26 which rises from the boss 23 alongside the front wall of the casing. A fan 27 is secured to the forward end of the fan shaft 24, and to the opposite end of the shaft, within the casing, there is fastened the water wheel 30. Preferably, the water wheel and the fan are screwed upon the opposite ends of the shaft 24, the threads running in the direction of rotation, so that the operation of the motor and fan will tend to keep the wheel and fan screwed tight upon the shaft. It will be observed that the water wheel is formed of an integral casting, and the only machine work required is the tapping of the hole for the reception of the inner end of the fan shaft.

At the time the casing member 21 is cast, a hole is cored therethrough, near its lower end, for the reception of the tapered end of the elbow 17, and on the inside of the casing the elbow has threaded upon it an ordinary cap 31. By screwing the cap 31 very firmly upon the end of the elbow, said elbow is drawn into very tight contact with the edge of the aperture 28, and the cap into firm engagement with the wall of the casing, and a water tight joint is thereby effected between the elbow and the casing. A small port 32 is formed in the side of the cap 31 by punching or drilling it, and the cap is turned so that a jet of water issuing from the port 32 will be directed against the vanes or buckets 33 of the water wheel. Attention is directed at this time to the formation of the vanes or buckets 33 and to the fact that, on account of their shape, the propelling stream strikes the inner surfaces of said buckets or vanes in a line substantially perpendicular thereto during practically all of the time that the jet is playing upon the respective buckets or vanes; and that the vanes or buckets are so spaced about the wheel that one bucket is not beyond reach of the jet of water, until the next bucket is in a position to receive the same.

The casing members 21 and 22 are formed with interlocking edges, as shown at 35, and are firmly held together by tie bolts 36 which pass through said members from front to rear, and have nuts 37 applied to them. Some satisfactory sealing material, such as that known to the trade as "sealit" is used in the joint between the casing members, as well as in the various threaded joints between the previously described parts. As will be seen most clearly from Fig. 3, the top of the casing is transversely curved on an arc having a radius somewhat greater than the water wheel, and from a plane substantially coincident with the fan shaft, the sides of the casing converge toward the bottom, where they terminate in a tubular extension 38, to which is applied a discharge conduit 39, which may be a piece of ordinary rubber hose. The hose depends from the casing and its lower end lies within a sink 40, so that the waste water from the motor may flow into the sink without splash or noise.

From the foregoing it will be seen that our invention provides a very cheap and efficient fan which may be conveniently supported by a faucet in any desired position with respect thereto, and within the radius of the supporting pipe 14, and that a very simple and effective means is provided for securing the structure to the smooth spout of an ordinary faucet; wherein very little machine work is required to put the parts involved in condition for assembly; which does not interfere with the water supply from the faucet while the same is connected therewith, and which can be operated at a very low cost.

Having thus described our invention, what we claim is:

1. A device of the character described comprising, in combination, a casing having an aperture in a side wall and adjacent one edge thereof, a shaft journaled within one of the side walls of the casing, a fan secured to the outer end of said shaft, a water wheel secured to the inner end of the shaft, a fitting having an inwardly converging portion which reposes within the aforesaid aperture, and a cap applied to the end of said fitting within the casing whereby the fitting is firmly drawn into contact with the edge of the aperture, the cap having a port in one side thereof through which a stream of water is directed against the vanes of the water wheel, said port being positioned to direct the stream in the plane of the wheel and tangential thereto.

2. A device of the character described comprising, in combination, a casing that is formed of two halves, the adjacent edges whereof are rabbeted complementary to each other, means for securing the halves of the casing together, a shaft journaled within one wall of the casing, a water wheel secured to the inner end of the shaft, a fan secured to the opposite end of the shaft, said casing being transversely curved on the top thereof and having its sides converge from a plane substantially coincident with said shaft toward the bottom thereof into an outlet, and said casing having an aperture in a side wall adjacent said outlet, a fitting having an inwardly converging portion which reposes within said aperture, and a cap applied to the end of said fitting within the casing whereby the fitting is firmly drawn into contact with the edge of the aperture, the cap having a port in one side thereof through which a stream of water is directed against the vanes of the water wheel, said port being positioned to direct the stream in the plane of the wheel and tangentially thereto.

In testimony whereof, we hereunto affix our signatures in the presence of two witnesses.

FRANK L. HURTT.
ALBERT S. WRIGHT.

Witnesses:
BRENNAN B. WEST,
HUGH B. MCGILL.